Figure 1:
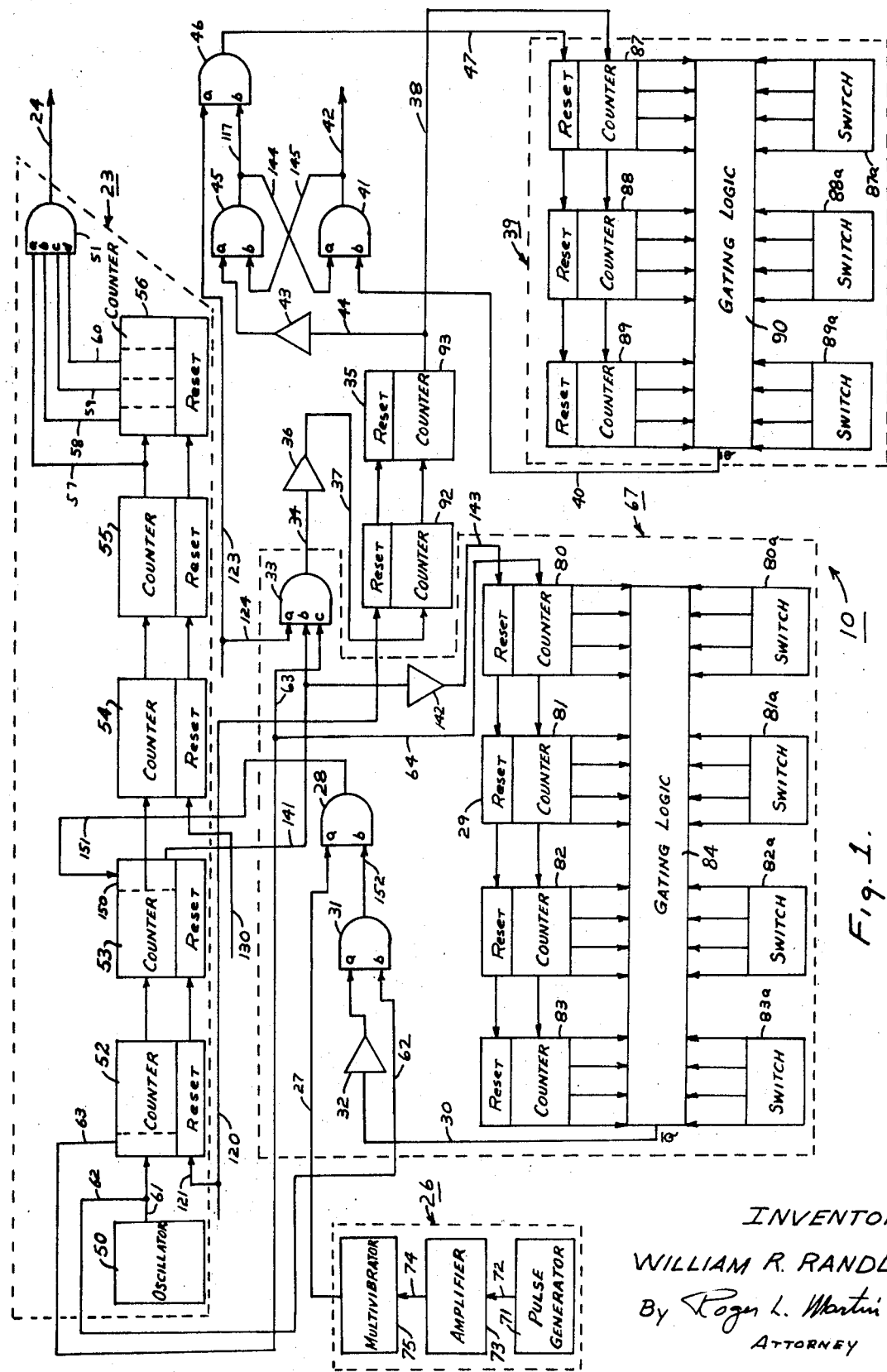

United States Patent [19]
Randle

[11] 3,742,195
[45] June 26, 1973

[54] RALLY RACE COMPUTER

[76] Inventor: William R. Randle, 2030 W. Livingston St., Orlando, Fla. 32805

[22] Filed: Nov. 3, 1971

[21] Appl. No.: 195,318

[52] U.S. Cl. ... 235/92 EV, 235/92 TF, 235/92 DM, 235/92 CP, 235/92 F, 235/92 R
[51] Int. Cl. .......................................... H03k 21/02
[58] Field of Search .................. 235/92 EV, 92 PD, 235/92 F, 92 TF, 92 CC, 92 DM, 92 CP; 73/489, 490

[56] References Cited
UNITED STATES PATENTS
| | | | |
|---|---|---|---|
| 3,652,832 | 3/1972 | Baumann | 235/92 EV |
| 2,344,497 | 3/1944 | Cooney | 235/92 PD |
| 2,951,986 | 9/1960 | Gordon | 235/92 EV |

Primary Examiner—Maynard R. Wilbur
Assistant Examiner—Joseph M. Thesz, Jr.
Attorney—Roger L. Martin

[57] ABSTRACT

A rally race computer includes a circuit providing a time based pulse output, a circuit having a distance based pulse output, a programmable divider circuit, a circuit having a distance based pulse output which includes a programmable multiplier circuit, a summation and visual display circuit for additively counting the time based pulse output and subtractively counting the distance based output, a circuit controllable to steer the distance based pulse output into a selected additive or subtractive mode in the summation circuit, and means manipulatable to control the steering circuit. Gating means of the multiplier circuit and a divider circuit component of the multiplier circuit, operate in dependency upon the oscillator output of the time based pulse providing circuit.

8 Claims, 3 Drawing Figures

INVENTOR
WILLIAM R. RANDLE
By Roger L. Martin
ATTORNEY

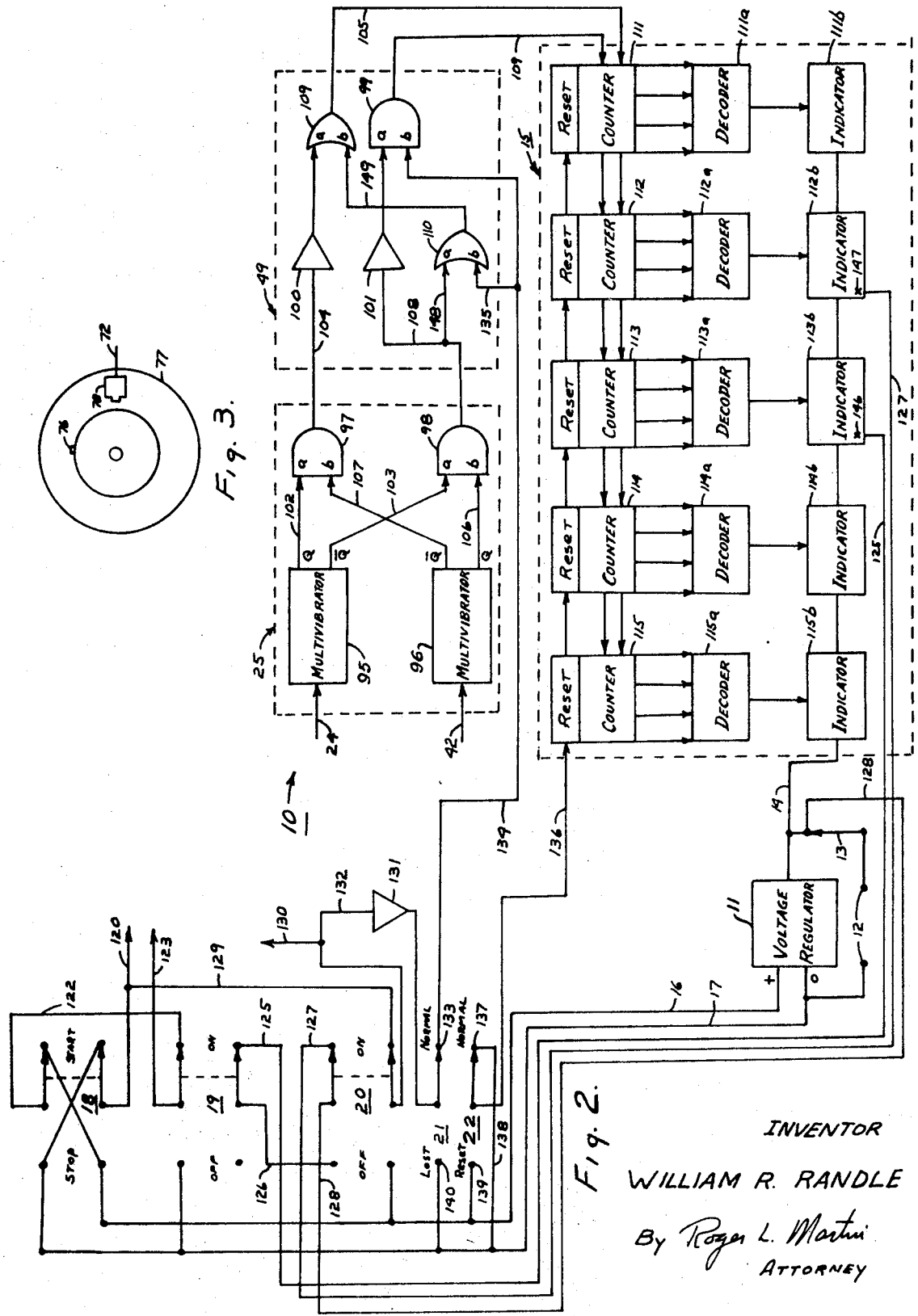

RALLY RACE COMPUTER

This invention relates to a computer for use in rally race automotive competition.

Rally racing has become a popular sport and passtime throughout the world. The object of the competitions is to traverse a previously laid out and marked road course in a predetermined time period. The winner of the competition is the contestant who covers the course in a period of time which most closely approaches the predetermined time period for the competitive meet.

The course to be traversed by the contestants is normally one that involves public highways and is appropriately marked by signs and established before the contest begins and under circumstances that the contestants are unaware of the course to be traversed during their participation in the race. Since public highways are involved, one can appreciate the fact that the average speed conditions to be maintained by the contestant can not always be met and hence the contestant is faced with a problem of adjusting the velocity of his vehicle to compensate for stop signs and other obstructions to the normal flow of traffic. Apart from this, one of the problems confronted by contestants is associated with the failure on the contestants part to observe a course marker. Under such circumstances, the contestant frequently gets off course and has to retrace his path until he observes the course marker previously missed.

The use of computers in such races has been suggested in the past but none of the suggestions, insofar as the inventor is aware, have made provisions for computing lost course time factors with the results that provide an accurrate and acceptable indication of the deviation from "on" course time. In most cases the computations are made with a slide rule by a passenger with the participant and who also functions as a navigational aid to the participant.

A general object of the invention is to provide an improved computer for use in an automotive rally race competitions. Yet another object of the invention is to provide a computer which will at all times during "on" course navigation provide an instantaneous readout indicative of the "on" course time condition. Yet another object of the invention is to provide a computer which can be easily manipulated by the driver so as to modify the readout to compensate for off course distances inadvertently traversed.

Yet another object of the invention is to provide a computer for rally race competition which can be readily calibrated to compensate for its use on vehicles having different tire sizes and which can be programmed to receive the speed variable during any one competition while nevertheless providing the same type of readout indicative of course time deviations in all competitive meets. Yet another object of the invention is to provide a computer for rally race competition which is economical to manufacture and simple to use.

In accord with one aspect of the invention a circuit having a time based output pulse is used in combination with a circuit having a distanced based output pulse, a summation device that operates in a totalizing mode to additively count the time based pulses and subtractively count the distance based pulses, and a steering circuit which is controllable to permit simultaneous additive counting of the time based and distance based pulses so that time lost during off course deviations during rally race competitions can be readily ascertained and displayed to the race participant. Another aspect of the invention has to do with the provision of a programmable multiplier circuit that operates in dependency upon a component of the circuit providing the time based pulse output as well as a pulse generating circuit that is responsive to the distance traversed by the vehicle, this aspect of the invention facilitating easy calibration of the computer and its use with different vehicles. Yet another aspect of the invention contemplates the use of a programmable divider circuit in conjunction with the multiplier circuit so as to provide a distance pulse output that can be varied to accommodate the speed conditions encountered in different rally races so as to have an indicator display in all meets which requires but one type interpretation. The inventor contemplates that the time based and distance based pulses may be used to operate stepping motors which through suitable gear arrangements may be used to operate a mechanical register in a totalizing mode to additively and subtractively count the different pulses and which can be provided with suitable gear shifting devices to simultaneously additively count the time and distance based pulses, but in accord with one aspect of the invention electronic up-down counting summation means operating in a totalizing mode is utilized in conjunction with certain gating circuitry which will hereinafter be disclosed in greater detail.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 and FIG. 2 diagrammatically illustrate a computer embodying the principles of the invention, with FIG. 1 depicting the circuitry providing the time based and distance based pulse trains that are normally thereafter additively and subtractively totalized and with FIG. 2 depicting the circuitry associated with totalizing the pulses and displaying the results along with certain switches that are used in the operation of the computer in various modes; and FIG. 3 illustrates one type of pulse generator that may be used for sensing the velocity of the vehicle.

Reference is now made to the drawings, and wherein a rally computer embodying the principles of the invention is generally designated at 10. It includes a voltage regulator 11 that is connected to the terminals 12 of the vehicle battery through a single pole, single throw "on-off" switch 13. Switch 13 controls the power supply to the voltage regulator 11, and in the "on" position supplies battery power through line 14 to the indicator light of a summation and visual indicator circuit 15.

The output lines 16 and 17 from regulator 11 supply the necessary voltage for the operation of the various circuit components through several switches which includes a stop-start switch 18, a distance switch 19, a clock switch 20, a lost switch 21 and a reset switch 22. These switches are connected to the output lines 16 and 17 as evident from the drawings and will be further considered subsequently.

Computer 10 has a time based pulse generating circuit 23 which provides a digital output signal of constant frequency in the circuit output line 24. This signal is fed to a coincidence eliminating circuit 25 in the illustrated embodiment and thereafter through a steering circuit 49 to the algebraic summation circuit. The distance based pulse generating circuit 26 of the computer provides a digital output signal in line 27, and this signal is fed to a two-input nand gate component 28 of a programmable pulse multiplier circuit 67 that includes a programmable pulse divider circuit 29. Circuit 29 provides a $\bar{Q}$ output which is fed by line 30 to a two-input nand gate 31 through a inverter 32. The multiplier circuit 67 also includes a three-input nand gate 33 and the output from the multiplier is passed by line 34 via an inverter 36 to a pulse scaler designated at 35.

The output signal from scaler 35 is then passed by line 38 to a programmable pulse divider circuit 39 and the output signal from this circuit 39 is passed by line 40 to a two-input nand gate 41. Gate 41 has an output signal which is fed by line 42 to the coincidence eliminating circuit 25. As seen in the drawings, the scaler output line 38 is tapped in the embodiment so that the output signal is also passed by line 44 through an inverter 43 and to another two-input nand gate 45. Gate 45 and yet another two-input nand gate 46 provide a reset pulse generating circuit having an output signal which is fed by line 47 to the resets of circuit 39. Circuits 26, 67, 35 and 39 operate in dependency upon the velocity of the vehicle, and the pulse output appearing in line 42 from gate 41 is determined by the distance traversed by the vehicle.

The time based pulse generating circuit 23 includes a crystal oscillator circuit 50, a four-input nand gate 51, and five binary counters that are designated at 52, 53, 54, 55 and 56 respectively. The counters are ganged in series with the fourth stage outputs of counters 52, 54 and 55 being fed to the first stages of counters 53, 55 and 56 respectively. Insofar as counter 53 is concerned, the fourth stage 150 is bypassed and used as a component of the multiplier circuit so that the third stage output of this counter 53 is fed to the first stage of counter 54. The fourth stage output of counter 55 is tapped in the illustration and fed by line 57 to gate 51 along with the outputs 58, 59 and 60 of the first three stages of counter 56. The oscillator is crystal controlled and has an output frequency of 436,906 ⅔ cycles per second in the illustrated embodiment. The arrangement of the binary counters provides an output signal in line 24 which has a frequency of 1 ⅔ cycles per second and which provides a convenient time base of 100 pulses per minute on which to base the design of the distance pulse handling circuits of the computer. Other time bases may be used and many other circuit arrangements will be apparent to those skilled in the art for providing a digital output signal having a suitable time base factor.

In the embodiment illustrated, the output signal of the oscillator 50 is tapped and passed by lines 62 to the "b" input terminal of gate 31 while the first stage output signal of counter 52 is tapped and passed by line 63 to the "c" input terminal of gate 33. Line 63 is also tapped so that the input signal passed by line 64 to divider circuit 29 also has a frequency that corresponds to that in the output of the first stage of counter 52. The divider circuit 29 accordingly operates in dependency upon the oscillator output signal and which is basically scaled in the first stage of counter 52 before being fed to the circuit.

The distance pulse generating circuit 26 includes a pulse generator 71 having an output 72 that is fed to an amplifier 73. The output 74 from amplifier 73 is fed to a one-shot multivibrator 75. The pulse generator 71 may take on various forms which will be well apparent to those skilled in the art and may include a magnetic or photoelectric pickup which senses an element or indicia on a rotating vehicle component having an angular velocity proportional to the speed of the vehicle as well as other means. In FIG. 3, the pulse generator 71 is illustrated as including a metal disk 76 that is mounted on a ground wheel 77 of the vehicle and rotatable therewith. A magnetic sensing device 78 that forms a component of the generator 71 is mounted on the frame of the vehicle in position to sense the disk 76 with each revolution of the wheel 77. Magnetic sensing devices 78 are well known in the art and provide a pulse output 72 which in accord with the illustration, is then amplified in amplifier 73 of the generating circuit 26.

The pulse divider circuit 29 of the multiplier circuit 67 is of conventional design and includes in the illustration four-decade counters designated at 80, 81, 82 and 83. These counters and their resets are ganged in series and the binary coded outputs are fed to gating logic 84 which is controlled by BCD switches 80a, 81a, 82a and 83a that are associated with the respective counters and their logics circuitry. The switches are manually manipulatable and enable one to calibrate the computer as will be subsequently understood.

Pulse divider circuit 39 is similar to divider circuit 29 and includes decade counters 87, 88 and 89 that along with their resets are series connected. The outputs of the counters are fed to gating logic 90 and which is also controlled by BCD switches 87a, 88a and 89a that are associated with the respective counters. These switches are also manually manipulatable and enable the participant to program the computer for the rally race speed conditions and thus have a common static base for comparison of the "on" course time.

Scaler 35 includes a pair of series connected decade counters 93 and 92 and which are also provided with series connected resets as seen in the drawings. Circuits 26, 67, 35 and 39 provide a circuit in the computer which operates in dependency upon the velocity of the vehicle and the pulse output signal appears in line 42 and is based upon a determined distance traversed by the vehicle. This distance can be determined by calibration as will be subsequently seen.

The coincidence eliminating and pulse steering circuits 25 and 49 include a pair of multivibrators 95 and 96, three nand gates designated at 97, 98 and 99, a pair of inverters designated at 100 and 101, and a pair of nor gates designated at 110 and 109. In the "on" course normal mode of operation of the computer, gates 97, 98, 99, 110 and 109 are normally closed.

When multivibrator 95 is triggered by a pulse from circuit 23, a Q output pulse is passed by line 102 and impressed upon the "a" input of gate 97. Simultaneously, a $\bar{Q}$ output pulse appears in line 103 and is impressed upon the "a" input of gate 98. The $\bar{Q}$ output in line 103 serves to maintain gate 98 in a closed condition while the signal in line 102 opens gate 97 and passes a signal via line 104 an inverter 100 to the "a" input of normally closed gate 109. This opens the gate 109 and delivers a pulse output signal, via line 105 to the up input terminal of the up-down summation counter section of circuit 15. When multivibrator 96 is triggered by a pulse from gate 41 it provides a Q output pulse via line 106 to the "b" input terminal of nand gate 98 and a simultaneous $\bar{Q}$ output pulse signal via line 107 to the "b" input terminal of gate 97. The signal in line 107 maintains gate 97 in the closed condition while the signal in line 106 opens gate 98 and delivers a pulse signal via line 108 and inverter 101 to the "a" input terminal of nand gate 99. This opens gate 99 and delivers a pulse output signal via line 109 to the down terminal of the up-down summation counting section of circuit 15. Gates 97 and 98 in conjunction with the multivibrators 95 and 96 and the dual output arrangements provide a means for eliminating the simultaneous delivery of additive and subtractive pulses to circuit 15.

The summation and visual indicator circuit 15 includes a plurality of five up-down decade counters designated at 111, 112, 113, 114 and 115 respectively. The counters together with their resets are ganged in series, as indicated in the drawings, and each has a binary coded decimal output which is fed to a decoder associated with the counter. Each decoder has a visual indicator which is driven by the driver section of the decoder. The decoders are designated at 111a through 115a inclusive and the indicators are designated at 111b through 115b inclusive.

As seen in the drawings, one pole of the start-stop switch 18 is connected by line 120 to the series connected resets of counters 92 and 93. Line 120 is tapped by line 121 to simultaneously control the resets of counters 52 and 53 of circuit 23. The other pole of switch 18 is connected by line 122 to one of the "on" contacts for one of the poles of the double pole, double throw distance switch 19. This pole is in turn electrically connected by line 123 to the "a" input terminal of nand gate 46. Line 124 is tapped into line 123 and connects with the "a" input terminal of nand gate 33 for reasons which will be subsequently apparent. The "on" contact for the other pole of distance switch 19 is connected to a line 125 that energizes a comma indicator in indicator 113b when switch 19 is "on" and when switch 20 is appropriately positioned. This pole of switch 19 is connected by line 126 to the "off" contact for one of the poles of the double pole, double throw clock switch 20. The "on" contact for this pole of clock switch 20 is connected by line 27 to a decimal indicator in indicator 112b. This same pole of clock switch 20 is connected by line 128 to the "on" contact of switch 13 so that battery power is provided to one or the other of the decimal or comma indicators 146 and 147 when the switches are appropriately positioned. The "on" contact for the other pole of clock switch 20 is electrically connected by line 129 to line 120, and this pole of switch 20 is connected by line 130 to the series connected resets for binary counters 54, 55 and 56. The pole of the single pole, double throw lost switch 21 is eletrically connected to line 130 through an inverter 131 by means of line 132. Switch 21 is shown in its normal position for the "on" course normal mode of operation of the computer, and the engaged contact 133 of switch 21 is electrically connected by line 134 to the "b" input terminal of gate 99. The "b" input terminal of gate 110 is in turn electrically connected to line 134 by line 135.

The pole piece of the single pole, double throw reset switch 22 is electrically connected by line 136 to the series connected resets of the decade counters in circuit 15 and is seen in its "normal" "on" course mode of operation in contact with switch contact 137 and which in turn is electrically connected by line 138 to ground line 17.

Before explaining the calibration of the computer and the normal and lost modes of operation, it is best to understand the stop clock and odometer modes of operation.

In the stop clock mode of operation, switches 13 and 20 remain in the "on" positions. This energizes the decimal indicator 147. The lost switch 21 also remains in the "normal" position, and the distance switch 19 remains in the off position. Placement of the distance switch 19 in the off position grounds lines 123 and 124 and places a ground condition on the "a" input terminal of gate 46. This impresses a reset voltage on the counters of circuit 39 and thus renders the divider circuit inoperative during the stop clock mode of operation. Prior to initiating start of the stop clock mode of operation, reset switch 22 is momentarily thrown to the reset position so as to impress a positive voltage on the reset mechanism of circuit 15. Thereafter, switch 22 is placed in the normal position to remove this reset voltage before the stop clock mode of operation is initiated.

To further condition the circuits for the contemplated mode of operation switch 18 is momentarily placed in the stop position. This momentarily impresses a positive reset voltage on the counters of circuit 35 and which are otherwise maintained inoperative for reasons of the position of distance switch 19. The stop position for switch 18 also impresses a positive voltage on the resets of counters 52 and 53 and which, of course, cause the flip-flop or fourth stage 150 of binary counter 53 to flop and establish a gate closing ground condition at the "b" input terminal of nand gate 33 and which because of inverter 142 impresses a positive reset voltage on the counters of circuit 29.

With the "on" position of clock switch 20, the momentary stop position of switch 18 also impresses a positive reset voltage on the resets of counters 54, 55 and 56 of circuit 23. This also simultaneously, by virtue of the normal position of switch 21, establishes a ground condition at the "b" *inputs of gates 99 and 110.*

With the circuits now conditioned, the stop clock mode of operation is initiated by throwing switch 18 to the start position. When this happens, the reset voltages to counters 52 and 53 as well as those impressed upon the scaler counters 92 and 93 are removed. By virtue of the "on" position of switch 20, the reset voltages on counters 54, 55 and 56 are also removed. With switch 21 in the normal position at the time the stop clock mode of operation is initiated, a positive voltage is impressed upon the "b" input terminals of each of gates 110 and 99. This condition on the input side of gate 110 basically opens gate 109 to the passage of pulse output of gate 97. It also primes gate 99 for the passage of the pulse output of gate 98 although the condition is never established during the mode of operation under consideration because of the positive reset voltage which is impressed on the counters of circuit 39.

Oscillator 50 is a crystal oscillator that has a Q output. By virtue of the binary counter arrangement in circuit 23, the frequency of the oscillator is divided by sixteen in counter 52, by eight in counter 53, by sixteen in counter 54, by sixteen in counter 55 and by eight in binary counter 56 so that the output in line 24 of circuit 23 is established at 100 pulses per minute.

Multivibrator 95 is a one-shot multivibrator which is triggered by each pulse to provide a Q pulse output in line 102 and a $\bar{Q}$ pulse output in line 103. Line 107 has a normal positive voltage and each $\bar{Q}$ output pulse in line 102 triggers gate 97. This impresses a positive voltage on the "a" input terminal of gate 109 so that a $\bar{Q}$ pulse appears in line 105 and is passed to the up input terminal of counter 111 each time the one-shot multivibrator is triggered.

The series connected counters 111 through 115 of course, continue to additively count the pulses delivered to the up terminals as long as the stop-start switch is in the start position. As such, the indicators 111b through 115b inclusive continuously provide a time indication to the nearest hundreths of a minute. When the stop clock mode of operation is terminated by throwing the switch 18 to the stop position, the indicators of circuit 15 will then indicate the time period between the initiation and termination of the mode of operation. It should be noted that in this mode of operation as well as in the subsequently to be described odometer mode of operation, that gate 99 is closed so that no signal appears at the down terminal of counter 111 to provide a subtractive count.

In the odometer mode of operation, switch 13 remains in the "on" position, switch 21 remains in the normal position, switch 20 remains in the "off" position, and the distance switch 19 remains in the "on" position. With the distance switch 19 in the "on" position and the clock switch 20 in the "off" position, comma indicator light 146 is energized. The position of switch 20 also impresses a positive voltage on the reset mechanisms of counters 54, 55 and 56 and renders these counters inoperative during the odometer mode of operation. As will be subsequently seen however, counters 52 and 53 of circuit 23 are functional during the mode of operation under consideration and this is necessary because of the multiplier circuit 67 operates in dependency upon the oscillator output signal and the output of the first stage of counter 52.

When clock switch 20 is thrown to the "off" position, a ground condition is established at the "*b*" *inputs of gates 110 and 99. This condition at nand gate 99 closes the gate while the condition established at gate 110 primes the nor gate for passage of the signal received through line 148 to the* "*b*" *input terminal of nor gate 109.*

Before initiating the odometer mode of operation, reset switch 22 is momentarily thrown to the reset position and then returned to the normal position so as to impress a positive voltage on the reset mechanisms of circuit 15. To further condition the computer, the stop-start switch is momentarily placed in the stop position. This impresses a positive voltage on the resets of counters 52 and 53 and also on the resets of the decade counters of scaler 35. The reset voltage applied to counter 53 also flops the flip-flop 150 and momentarily closes the gate 33. This applies a positive voltage to the resets of the decade counters of circuit 29 and further conditions the circuit.

The stop position or switch 18 also grounds lines 122 and 123 for reasons of the "on" position of switch 19 and thereby momentarily grounds the "a" input terminals of nand gates 33 and 46. The condition established at nand gate 46 impresses a positive voltage on the reset mechanism of circuit 39.

To initiate the odometer mode of operation, after the circuit has been conditioned, switch 18 is next thrown to the start position. This removes the reset voltages from binary counters 52 and 53 and also removes the reset voltages from the scaler counters 92 and 93. It also, because of the "on" position of the distance switch, impresses a positive voltage at the "a" input terminals of nand gates 33 and 46. The condition thus established at nand gate 33 basically primes the gate for the passage of signal 63 under the control of the flip-flop 150 output that is delivered to the "b" terminal of the gate. The condition at nand gate 46 basically releases the reset voltage that has been previously applied to the counters of circuit 39 and also opens the gate for the passage of reset pulses during the mode of operation under consideration.

During the odometer mode of operation, the Q pulse output 63 of the first stage of binary counter 52 is continuously fed to the "c" input terminal of nand gate 33. By virtue of the line tap, the signal is also fed to the first stage counter of divider circuit 29 through line 64. When flip-flop 150 flips a positive voltage is impressed upon the "b" input of nand gate 33 so that the gate, as conditioned at the "a" input terminal, is open to the passage of the pulse input in line 63. The flip of the fourth stage 150 also releases the reset voltage on the counters of circuit 29. Thereafter, when the flip-flop 150 flops to the reset condition, a ground condition is established at the "b" input of nand gate 33 to close the gate while a positive reset voltage is applied to line 64 and thus to the counters of circuit 29.

The flip-flop 150 is controlled by the pulse output appearing in line 27 of circuit 26 and also by the output pulse appearing in line 30 of circuit 29. Each time wheel 77 completes a revolution, element 76 is sensed by the magnetic pickup 78 so that a pulse 72 is fed to the amplifier. The amplified pulse 74 then triggers the one-shot multivibrator 75 to provide a $\bar{Q}$ pulse output in the input line 27 to normally open gate 28. This generates a Q pulse in the output line 151 and flips the flip-flop 150 to provide an open condition at gate 33 for the passage of the pulse output supplied to the "c" input terminal of the gate.

The length of time that the gate 33 is opened is determined by the switch settings in circuit 29 and these settings are established when the computer is calibrated as will be subsequently seen. In any event, the oscillator output signal is tapped by line 62 and is fed to the normally closed gate 31. Gate 31 is open for the passage of the oscillator output when ground condition is removed from the "a" input terminal of gate 31 by $\bar{Q}$ pulse output from circuit 29. Opening of gate 31 delivers a $\bar{Q}$ pulse to the "b" input terminal of gate 28 and passes a Q pulse to the flip-flop 150 to again establish gate closing ground conditions at the "b" input terminal of gate 33. This simultaneously impresses a reset voltage on the counters of circuit 29 so that the cycle repeats itself in the divider circuit.

The multiplier pulse output appears in line 34 and is delivered to the scaler 35. The scaler output appearing in line 38 is fed to the decade counters of circuit 39. Scaler 35 serves to divide a pulse train by a factor 100 before it is passed to circuit 39. The circuit arrangement of the illustrated embodiment of the invention is such that switches 87a through 89a can be positioned to the average speed conditions for a rally race competition so that the indicators of circuit 15 provide a zero readout when a contestant is meeting the course time requirements. In the odometer mode these switches are set to provide a predetermined divisional factor that provides a numerical pulse readout directly proportional to the mileage covered and is preferably a factor of one so that 60,000 pulses represent a distance of one mile.

Multivibrator 96 is triggered by a Q pulse in the output line 42 of gate 41 and scaler 35 has a Q pulse output which is fed to the divider circuit 39. For reasons of the loops 144 and 145, this establishes gate 45 as normally closed and primes gate 41 for the passage of the $\bar{Q}$ pulse output appearing in line 40 of circuit 39. During normal counting operation of circuit 39, gate 45 remains closed until the count is registered in divider circuit 39 and triggers a $\bar{Q}$ pulse output in line 40. Gate 41 is then triggered to provide a Q pulse in line 42 and by virtue of the loop 145, this opens gate 45 to pass pulses via line 117 to gate 46. This triggers the gate to provide a reset pulse in line 47 that resets the counters of circuit 39 so that the cycle can repeat itself.

In the odometer mode of operation gate 51 of circuit 23 remains closed and inoperative because of the voltage applied to the resets of counters 54, 55 and 56. As such, the only pulse delivered to circuit 25 is by way of line 42. Multivibrator 96 is a one-shot multivibrator that provides a Q pulse output that is delivered by line 106 to the "b" terminal of gate 98 and also a $\bar{Q}$ pulse output that is delivered to the "b" terminal of gate 97 each time the multivibrator is triggered. Gate 97 remains closed during the operation of the computer in the odometer mode and provides a prime condition at the "a" input terminal of gate 109 so that a positive going pulse in line 149 will open gate 109 and generate a $\bar{Q}$ pulse in line 105 to drive the counter in the up or positive direction. Gate 99 remains closed during this mode of operation since the "b" input terminal is at ground condition and hence a Q pulse from the one-shot multivibrator 96 establishes ground conditions at the "a" input terminal of gate 110 and provides a positive going pulse at the "b" input of gate 109. This triggers the gate 109 to register a count in circuit 15. The counters of circuit 15 operate in an algebraic totalizing mode and register a count which is indicative of the distance traversed by the vehicle in the start of the odometer mode of operation. If the computer is calibrated to provide 60,000 pulses in the output line 34 from multiplier 67 and the divider circuit 39 is set to divide by a factor of one, then the indicators will register 60,000 pulse count over a one mile course in the odometer mode of operation.

To calibrate the computer so that the count reigsters in any one time in circuit 15 is zero when an "on" course time condition is being met in a rally race competition, the need arises in view of the 100 pulse per minute time base established by circuit 23 to establish a 100 pulse per minute input to multivibrator 96 when the "on" time course conditions are being met. To accomplish this with a chained decade counter divider circuit which can be programmed to insert a speed variable that is predetermined for each rally race competition, the need arises to supply a predetermined number of pulses at the input terminal of the divider circuit 39 during each mile traversed by the vehicle. This pulse per mile factor is a constant, determined solely by the time base established by circuit 23.

With this constant in mind, it remains that to secure the nearest resolution and to provide adjustable means for calibrating the computer to accommodate its use with pulse generator arrangements other than those shown at 71 in FIG. 1 and still provide means for recalibrating to compensate for tire wear between rally race competition meets, a variable means for multiplying the pulse output of the distance pulse generator is needed. This variable means is provided in the multiplier circuit of the illustrated embodiment by means of the programmable divider circuit 29 and which as previously pointed out, regulates the closing of gate 33 through its control of gate 31. The computer illustrated contemplates the insertion of the speed variable to the-nearest tenth of a mile per hour in circuit 39 so that this establishes the constant factor at the input terminal of the programmable divider circuit at 60,000 pulses per mile in view of the time base constant.

To calibrate the computer, the computer is operated in the odometer mode over a measured course with the BCD switches adjusted to provide a dividing factor of one in circuit 39. If the course is one mile, and BCD switches 80a through 83a are properly set, the readout by the indicators of circuit 15 will correspond to 60,000 pulses. If the readout for the measured mile course exceeds this number, then the switches of circuit 29 are adjusted to appropriately diminish the dividing factor programmed into the computer. Conversely, if the readout of the indicator circuit is less than 60,000, switches 80a through 83a are adjusted to increase the division factor in circuit 29.

With the computer properly calibrated to account for the vehicle variables, the computer can then be used for race competition as indicated below.

To condition the circuitry for rally race competition, switch 13 is placed in the "on" position to energize the indicator display and to also energize the voltage regulator. With this accomplished the reset switch 22 is momentarily thrown to the reset condition so as to reset the counters of circuit 15 and thereafter return to the normal position where it remains during the race. Switch 21 is placed in the normal position and where it remains except under lost conditions to be subsequently covered. To further condition the circuitry for rally race competition, switch 18 is moved to the stop position and switches 19 and 20 are placed in the "on" position indicated in the drawings. This arrangement impresses a reset voltage on all the counters of circuit 23 and also on the counters of circuit 35. It also impresses ground conditions on the "b" input terminals of gates 99 and 110 until such time as the switch is thrown to the start position. It additionally impresses ground conditions on the "a" input terminals of gates 33 and 46. The reset voltage applied to counter 53 of course, flops the last stage 150 of counter 153 and similarly impresses a reset condition on the counters of circuit 29.

As the race starts, switch 18 is thrown to the start position. This impresses a positive voltage on the "b" input terminal of gate 110 and establishes a closed gate condition while simultaneously impressing a positive voltage condition on the "b" input of gate 99 so to prime this gate for the passage of the distance pulses. The start position for switch 18 also removes the reset voltages from all the counters of circuit 23 as well as from the counters of circuit 35. In so doing this it also removes the reset voltage from the counters of circuit 29. Simultaneously, a positive voltage is impressed upon the "a" input terminal of gate 33 and 46 so as to condition these gates for operation as previously explained in the odometer mode of operation. Thereafter the circuits preceding the coincidence eliminating circuit 25 operate simultaneously.

Insofar as circuits 25 and 49 are concerned, the positive voltage impressed upon the "b" input of nor gate 110 retains the gate in a closed condition during the normal "on" course of operation of the rally computer so that the output of gate 98 passes by way of line 108 and inverter 101 to gate 99 and thence to the down terminal of the decade counters for subtractive counting in circuit 15. The pulse output of gate 97 passes by means of line 104 to gate 109 and thence to the up input terminal of the decade counters for additive counting in circuit 15.

Lines 103 and 107 as connected to the $\bar{Q}$ outputs of the multivibrators and to the input terminals of gates 97 and 98 provide a means for eliminating the coincidence appearance of pulses at the up and down terminals of the counters of circuit 15. When multivibrator 95 and 96 are triggered simultaneously, both of the gates 97 and 98 remain closed and accordingly, effectively block passage of the pulses and thus the simultaneous arrival of the pulses at the up and down input terminals of the counters.

As long as the contestant is maintaining the predetermined average speed for the rally race that is set into the switches of circuit 39, the visual display of the indicators will display a zero readout. In the event the participant is behind schedule on the course, more up pulses will have been fed to the decade counter chain of circuit 15 then down pulses and hence, the indicators will show a positive display number. For example, the indicators may display a readout of 000.32 if the participant is 0.32 minutes behind schedule. If the participant is ahead of schedule on the course, the indicators will have a negative readout as will be indicated for example by 999.72 when the participant is 0.28 minutes ahead of schedule. If the participant stays on course and reaches the terminal point of the race with the indicators as evidencing a zero readout, then he will have completed the course precisely on time within the precision of the computer resolution and the time required for momentary switching.

As frequently happens during a rally race, the participant fails to observe a course marker and proceeds along the off course route before he realizes his lost condition. Under such circumstances, the participant reverses his course on the lost route and simultaneously throws a lost switch 21 to the lost position as he turns to retrace his steps. When this occurs, the "b" input terminals of gates 99 and 110 are grounded so that gate 99 is closed and gate 110 is open for the passage of the pulses from gate 98 to the nor gate 109. As a result of this, the distance pulses are fed to the up input terminal of the decade counter of circuit 15 as the participant retraces the off course path. As the participant arrives back on course, lost switch 21 is then thrown to the normal position in contact with switch contact 133 and the counting proceeds as under the "on" course conditions. The overall result of manipulating the lost switch is that the distance pulses fed to the counter under the lost conditions are basically cancelled out of the totalized display count. The indicators of course, will after a lost situation normally have a substantial positive count which will indicate that the driver should increase his velocity during the balance of the course so as to thereafter approach a zero readout condition indicative of the "on" course timing.

While only certain preferred embodiments of this invention have been shown and described by way of illustration, many modifications will occur to those skilled in the art and it is, therefore, desired that it be understood that it is intended herein to cover all such modifications as fall within the true spirit and scope of this invention.

What is claimed as new and what it is desired to secure by Letters Patent of the United States is:

1. The combination with a wheeled vehicle of a computer for use in rally race competition comprising a first circuit having a time based pulse output signal, a second circuit operating in dependency upon the velocity of the vehicle and having a pulse output signal based on a predetermined distance traversable by the vehicle, summation means selectively operable in a first totalizing mode to additively count pulses in the output signal of the first circuit and subtractively count pulses in the output signal of the second circuit and in a second totalizing mode to additively count pulses in both of the output signals of said first and second circuits, controllable means for controlling the totalizing mode of operation of said summation means, and display means responsive to the summation means for indicating the totalized count, said controllable means being manually controllable to selectively operate said summation means in said first totalizing mode or said second totalizing mode.

2. The combination in accord with claim 1 where the summation means comprises electronic up-down counting means, where the controllable means comprises first normally open gate means responsive to the time based output signal for delivering pulses to said up-down counting means, second normally open gate means responsive to the distance based output signal for delivering pulses to said up-down counting means, third normally closed gate means responsive to the distance based output signal for delivering pulses to said first gate means, and where the computer further ocmprises manually controllable means for simultaneously closing said second gate means and opening said third gate means.

3. The combination in accord with claim 1 where the second circuit includes a third circuit for generating a pulse output signal in response to rotation of a wheel component of the vehicle, a pulse multiplier circuit operating in dependency upon the receipt of the output signal of the third circuit and having a pulse output signal, and a pulse divider circuit operating in dependency upon the pulse output signal of said pulse multiplier circuit, said pulse divider circuit being programmable to calibrate the computer for a predetermined rally race speed variable and provide a predetermined number of pulses in the output signal of said second circuit for a predetermined distance traversible by the vehicle.

4. The combination in accord with claim 3 where said pulse multiplier circuit includes a pulse divider circuit programmable to calibrate the computer for variable vehicle factors to provide a predetermined number of pulses in the multiplier circuit outut signal for a predetermined distance traversible by the vehicle.

5. The combination in accord with claim 4 where the first circuit includes an oscillator having an output signal, where the pulse divider circuit component of said multiplier circuit operates in dependency upon the output signal of said oscillator.

6. The combination in accord with claim 5 where the pulse divider circuit component of said multiplier circuit has a pulse output signal, where the multiplier circuit further includes normally closed gate means adapted to open in response to a pulse output from said divider circuit component.

7. The combination with a vehicle of a computer comprising a circuit having a time based pulse output signal and including an oscillator having an output signal, a circuit operating in dependency upon the velocity of the vehicle and having a pulse output signal based on a predetermined distance traversable by the vehicle, electronic summation means operating in a totalizing mode to additively count the time based pulses and subtractively count the distance based pulses, and display means responsive to the summation means and indicating the totalized difference between the additive and subtractive counts; said circuit having the distance based pulse output signal including a pulse multiplier circuit operating in dependency upon the output signal of said oscillator, normally closed first gate means having an input terminal connected to receive the output signal of said oscillator, a pulse divider circuit operating in dependency upon the output signal of said oscillator and having a pulse output, said normally closed gate means being responsive to the pulse output of said divider circuit to open and pass said oscillator output signal, and normally closed second gate means having a multiplied pulse output signal and operating in dependency upon the signal passed by said first gate means.

8. The combination in accord with claim 7 where the circuit having the distance based pulse output signal further includes a distance based pulse generating circuit having a pulse output, and where said second gate means operates in dependency upon the pulse output of said distance based pulse generating circuit.

\* \* \* \* \*